March 24, 1936.  H. J. CRINER  2,034,898
BREAD SLICING MACHINE
Filed Jan. 22, 1934   3 Sheets-Sheet 1

INVENTOR.
Harry J. Criner
BY
Bush & Bush
ATTORNEYS.

March 24, 1936.  H. J. CRINER  2,034,898
BREAD SLICING MACHINE
Filed Jan. 22, 1934  3 Sheets—Sheet 2

INVENTOR.
Harry J Criner
BY
Bush~Bush
ATTORNEYS.

Patented Mar. 24, 1936

2,034,898

UNITED STATES PATENT OFFICE 2,034,898

BREAD SLICING MACHINE

Harry J. Criner, Davenport, Iowa, assignor of one-half to A. G. Bush, Davenport, Iowa Application January 22, 1934, Serial No. 707,761

10 Claims. (Cl. 146—153)

My invention relates to improvements in bread slicing machines in which laterally reciprocating series of blades are utilized to slice an entire loaf of bread at one operation.

The objects of my invention are:

1. To provide a bread slicing machine of superior lightness, simplicity and efficiency;
2. To reduce vibration to a minimum;
3. To provide such a machine of a size suitable to be mounted upon an ordinary counter or table for convenient use in stores, hotels, etc., but which can also be directly connected to a wrapping machine if desired and have a large capacity and be operable at high speeds;
4. To provide means to reduce the friction on the guides which control the direction of movement of the cutting blades;
5. To provide a machine which will permit a gravity feed with a steeply inclined bread chute and thus accelerate the cutting process;

Other objects will appear from the following description.

I accomplish these objects by the means illustrated in the accompanying drawings, in which—

Fig. 4 is an enlarged detail top view of a portion of the bread chute showing the slots for the blades to pass through;

Similar numerals refer to similar parts throughout the several views.

Figure 1:
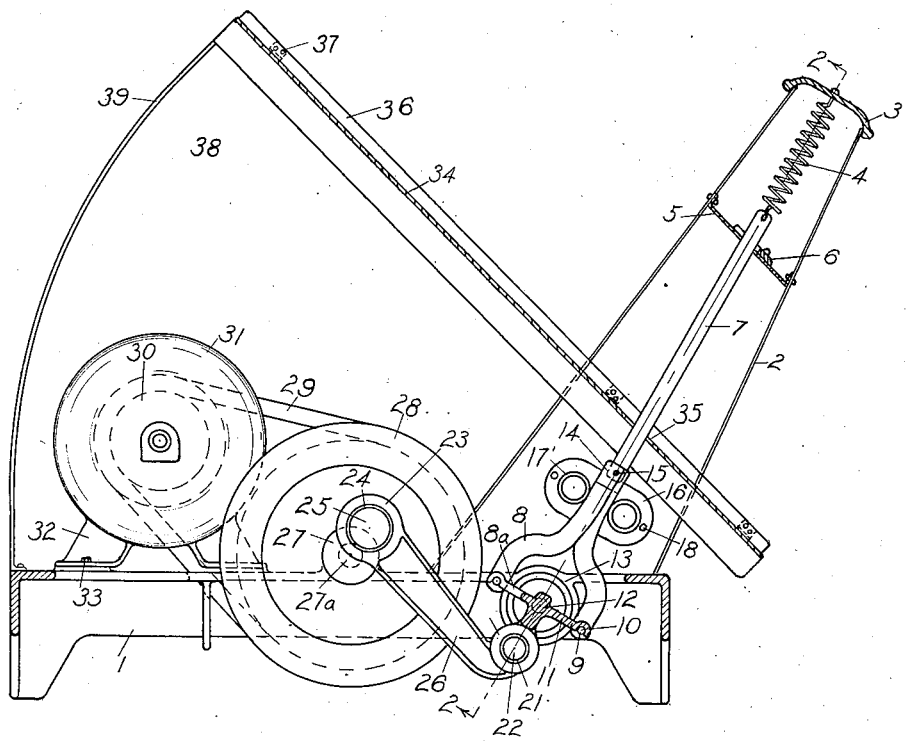
Figure 1 is a vertical section of my slicer on the line 1—1 of Figure 2.
Figure 7:
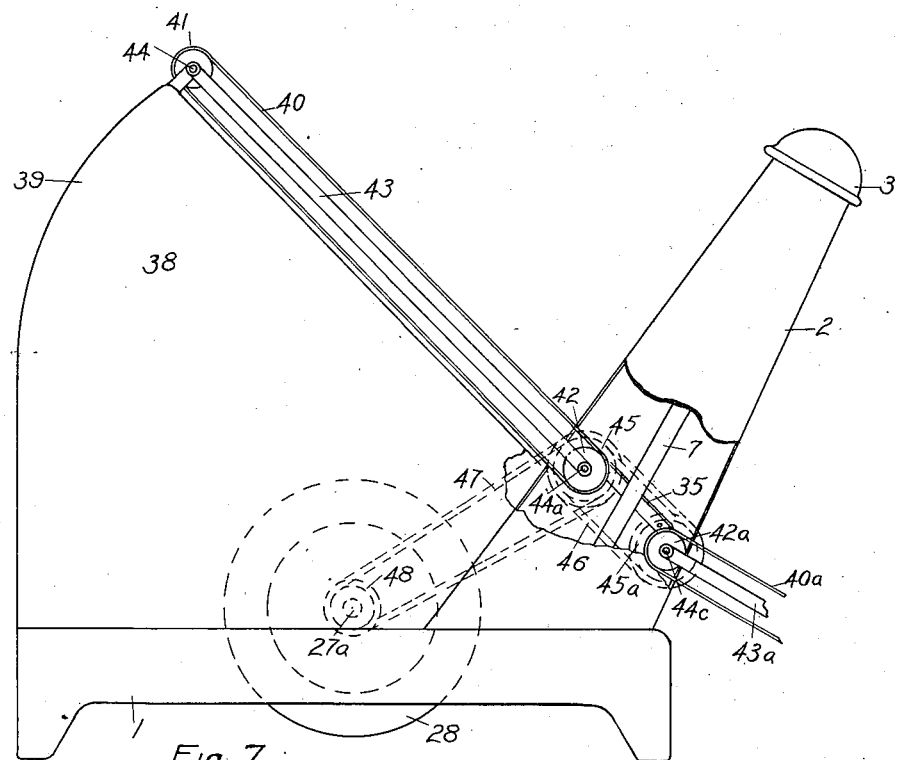
Figure 7 is a side elevation of a modified form of my machine showing a power feed to increase the speed thereof with part of the housing broken away.
Figure 8:
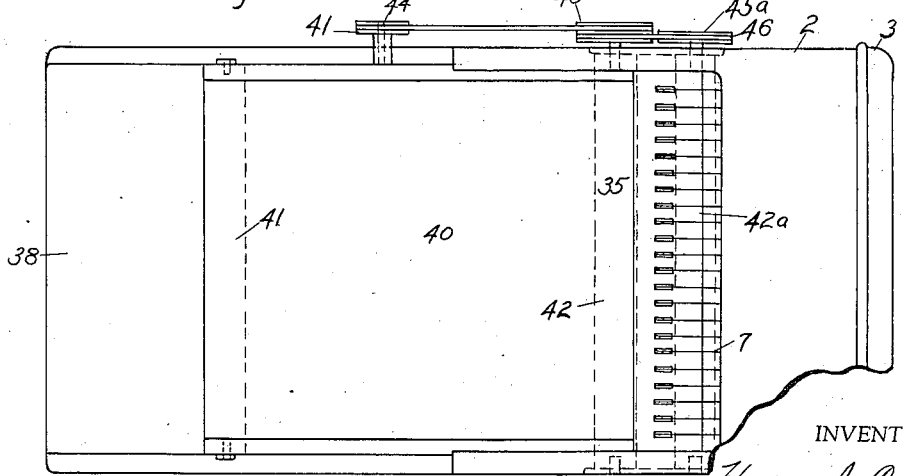
Figure 8 is a plan view of Figure 7, with part of the housing broken away.

My machine comprises a base, 1, preferably of a convenient size to rest upon a table, counter or the like. A housing, 2, is united to the base and extends upwardly from the base. The housing is preferably secured at an angle to the base and inclined forwardly as shown in Figures 1 and 7. This housing, 2, is preferably formed of light-weight sheet metal and may be united to the base by bolts, rivets or any suitable means.

Bearings, 27, are formed integral with the base near the middle of the upper face and on opposite sides thereof, in which a shaft, 27a, is mounted which carries a belt-driven flywheel and pulley, 28. A suitable support, 32, is mounted upon the base and carries an electric motor, 31, having a drive pulley, 30, which drives the belt, 29, and thereby the flywheel, 28. The belt, 29, is preferably of the V-type and the pulleys, 30 and 28, are grooved to fit the belt.

A crank pin, 25, is secured upon the flywheel upon which is mounted one end of a connecting-rod, 26, with an oilless bushing, 24, interposed between the connecting-rod and crank pin.

Figures 2, 6:
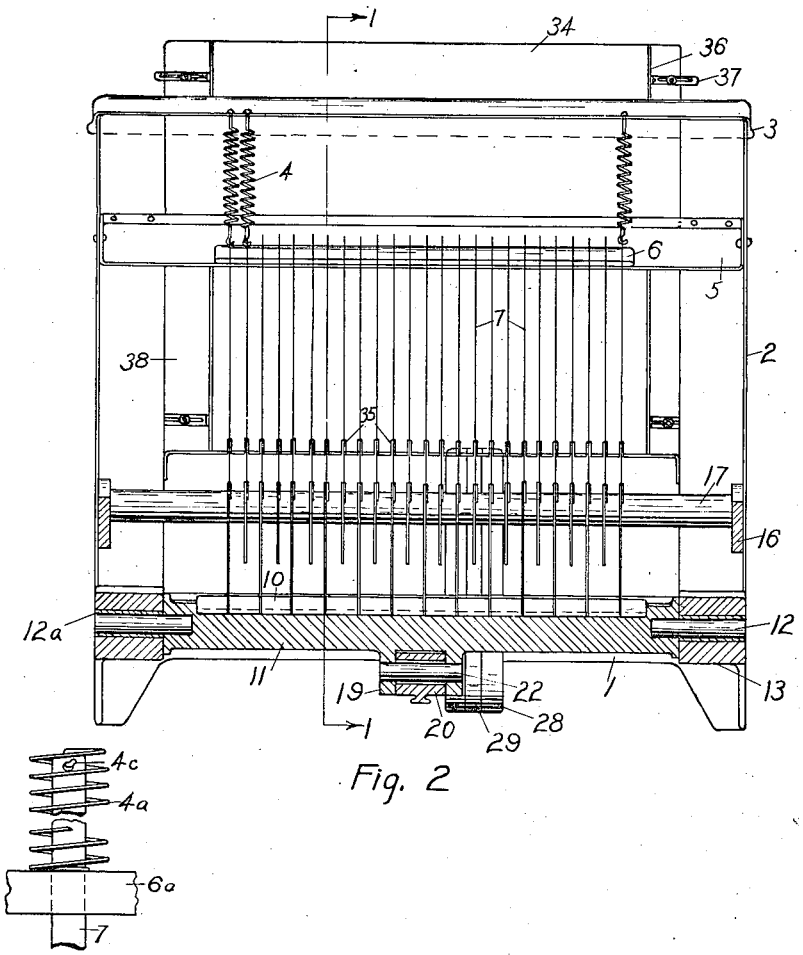
Figure 2 is a cross-section on the line 2—2 of Figure 1.
Figure 6 is an enlarged detail view of an alternate form of spring mechanism utilizing a compression spring in place of a tension spring.

A transverse rocker plate, 11, is mounted within the base, 1, at the lower end of the housing, 2, upon pins or stub-shafts, 12', which are rotatably secured in bushings, 12a, secured in bearings formed in the base, 1, on opposite sides thereof as shown in Figure 2.

The under face of the rocker plate, 11, has longitudinal grooves, 10, formed therein at opposite edges thereof. These grooves are provided with pivot bars, 9, which fit in the grooves, 10. The outer edges of the rocker plate, 11, are indented or slotted at right angles to the grooves, 10, the slots extending inwardly past the grooves, with a plurality of slots equal in number to the number of blades in the machine. The slots upon one edge alternate or are staggered with relation to the slots upon the other edge.

In each of these slots, a lower end of a corresponding link, 8, is inserted, and being bored out to fit the pivot bars, 9, is secured in place by the pivot bar.

Figure 3:
Figure 3 is an enlarged detail top view of the upper end of one of the links.
Figure 4:
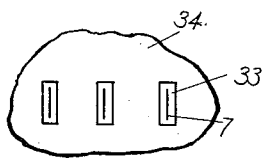
Figure 5:
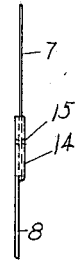
Figure 5 is an enlarged detail of one of the links and the blade pivoted thereto.
Figure 5:
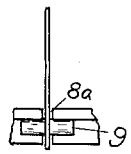

The upper ends of each link, 8, are severally pivotally united to the lower ends of the cutting blades, 7, and for that purpose the upper end of each link, 8, is preferably doubled or folded as shown in Figure 3 and provided with a pivot, 15, which, passing through the hole in the lower end of the blade, 7, secures each link, 8, and its corresponding blade, 7, together. The upper ends of the blades, 7, are severally connected to tension springs, 4, the other ends of the tension springs being secured in the cover plate of the housing, 2.

An alternate form of spring is shown in Figure 6, in which a compression spring 4a, is utilized in place of a tension spring, 4, and a support, 6a, is provided for the lower ends of the tension springs while the upper ends of the tension springs have their ends, 4c, extending through suitable openings in the upper ends of the blades, 7.

The upper ends of the links, 8, are secured between rolls, 17, which bear upon the upper ends of the links and form guides for the links to prevent displacement thereof. These rolls have their ends secured in bushings, 17', mounted in brackets, 16, secured upon the inner faces of the housing, 2, by rivets, 18.

In the form of machine just described, it is obvious that there must be a lower link, 8, for each of the blades.

The lower ends of the arms, 8a, are pivotally mounted upon a cross-shaft, 9a, which extends transversely of the machine and has its ends mounted in suitable bushings, 9c, secured in rocker plates or arms, 50, mounted upon the ends of a rocker shaft, 12'. The lower ends of the arms, 8b, are similarly arranged. The rocker shaft, 12', has connected thereto an arm, 51, which may be secured to the shaft, 12', by set screws, 12c, or by a spline, key or other suitable means.

The arm, 51, is bored out to receive a connecting rod pin, 22, which passes through the forked end of a connecting rod, 26, and is surrounded by a bushing, 21.

A sloping bread chute, 34, is mounted in the sides, 38, of the base housing, 39, secured by brackets, 37, or other suitable means. The bread chute, 34, may be formed with lateral flanges, 36, to prevent displacement of the bread.

In slicing bread by such machines, I find that better results and smoother cutting can be accomplished by having the blades travel substantially at a right angle to the plane of travel of the loaves of bread while being sliced than by having them travel at the acute angle shown where a sloping breadboard is used with vertical blades.

By my arrangement, there is less likelihood of the loaves being displaced. By steeply inclining the breadboard downwardly to and past the blades, the force of gravity will cause even a single loaf to travel rapidly through and past the series of blades.

I accordingly incline my bread chute steeply and incline the blade housing forwardly at approximately a corresponding angle so that the blades travel at substantially a right angle to the bread chute. When so arranged, gravity will give a fairly rapid feed, but when desired to provide a forced speed, a carrier, 40, mounted upon rolls, 41 and 42, may be provided. The roll, 41, is provided with a shaft, 44, which is suitably mounted in supports formed integral with the base housing, 39, and the roll, 42, is provided with a similar shaft, 44a, similarly mounted. Upon one end of the shaft, 44a, I mount a belt wheel, 45, driven by a belt, 47, carried by a drive pulley, 48, mounted upon the shaft, 27a. A take-off conveyor, 40a, one end of which is carried by the roll, 42a, mounted upon a shaft, 44c, extending transversely of the housing, 2, just below the blades, may be driven by a belt, 46, passing over a pulley, 45a, at the same speed as the feed conveyor.

Slots, 33, are formed in the bread chute to permit the passage of the blades up and down through the bread chute. A guide plate, 5, is mounted in the upper end of the housing, 2, with slots formed therein to permit the passage of the blades, 7, therethrough and a comb-shaped guide, 6, of wood, fiber, or other suitable material is secured to the plate, 5, with teeth extending between the blades to act as guides for the upper ends thereof.

My machine may utilize a link, 8, united to the lower end of each blade and when this multiple construction is shown, the rolls, 17, will act as guides against which the upper ends of the links will operate so as to cause both sets of blades to move substantially in the same plane, the machine as shown in Figure 7 as the front of it and the left of the machine as shown in Figure 7, as the back of it. The rolls, 17c, forming the guide for the cross-head united to the arms, 8a, will prevent forward displacement of such cross-head.

In the operation of my machine, the bread is placed upon the chute, 34, either manually or by mechanical feed, and as the motor, 31, drives the belt, 29, the pulley, 28, will revolve carrying with it the connecting-rod, 23, thus causing the rocker plate, 11, to oscillate on its pivot-shaft, 21. As the shaft oscillates in one direction, the links attached to the front of the rocker plate will be drawn downwardly and as it oscillates in the opposite direction, the rear links will be drawn downwardly carrying their respective blades as they move. The downward movement of the blades throws an increased tension upon the springs, 4, which act to return the blades to their uppermost position when the downward pressure of the rocker-plate thereon has ceased.

It will be noticed that this arrangement makes it possible to reduce the number of moving parts to a minimum. The rocker-plate, 11, should be carefully balanced. The links, 8, should be made all of same size and weight and preferably of very light material. The blades, 7, may be made of very light spring steel and the springs, 4, should be of uniform size and tension.

When thus arranged, the weight of the front links will balance the weight of the rear links and the constant tension of the springs, 4, acting upon the blades will at all times keep close contact between the pins, 9, and the grooves.

This form of machine will permit a very rapid operation with very little vibration and will consequently reduce the inevitable wear.

While this machine is primarily designed to be made in small size suitable for use upon a counter or table in stores, hotels, etc., it is obvious that it may operate at very high speed and may be mounted upon an independent, full-sized base having legs formed integral therewith.

I do not confine my claims to the precise forms shown in the drawings as it is obvious that various modifications thereof may be made without departing from the spirit of my invention.

I claim:

1. A bread slicing machine comprising a base, a housing united thereto, a shaft mounted in the base, a rocker-plate united to the shaft extending transversely across the base and having staggered slots formed in its front and rear edges, pivot-bars secured in the front and rear edges of the rocker passing through the slots adapted to engage and drive links, a plurality of links severally having their lower ends pivoted upon the pivot-bars and extending upwardly therefrom, a plurality of spaced cutting blades having their lower ends pivotally united to the upper ends of the links severally, the upper portions of said links being straight and arranged in line with the blades, a corresponding plurality of coiled tension springs having their upper ends adjustably united to the housing at the top thereof and their lower ends pivotally united to the upper ends of the cutting blades, and means for reciprocating the rocker-plate.

2. A bread slicing machine comprising a base, a housing united thereto, a shaft mounted in the base, a rocker-plate united to the shaft extending transversely across the base and having staggered slots formed in its front and rear edges, pivot-bars secured in the front and rear edges of the rocker passing through the slots adapted to engage and drive links, a plurality of links severally having their lower ends pivoted upon the pivot-bars and extending upwardly therefrom, a plurality of spaced cutting blades having their lower ends pivotally united to the upper ends of the links severally, the upper portions of said links being straight and arranged in line with the blades, and their several lower portions being curved to the front or rear to enter the front and rear slots in the rocker-plate, a corresponding plurality of coiled tension springs having their upper ends adjustably united to the housing at the top thereof and their lower ends pivotally united to the upper ends of the cutting blades, and means for reciprocating the rocker-plate.

3. A bread slicing machine comprising a base, a housing united thereto, a shaft mounted in the base, a rocker-plate united to the shaft extending transversely across the base and having staggered slots formed in its front and rear edges, pivot-bars secured in the front and rear edges of the rocker passing through the slots adapted to engage and drive links, a plurality of links severally having their lower ends pivoted upon the pivot-bars and extending upwardly therefrom, a plurality of spaced cutting blades having their lower ends pivotally united to the upper ends of the links severally, the upper portions of said links being straight and arranged in line with the blades, a corresponding plurality of coiled tension springs having their upper ends adjustably united to the housing at the top thereof and their lower ends pivotally united to the upper ends of the cutting blades, means for reciprocating the rocker-plate and guide rolls extending transversely of the machine at the front and rear of the links and adapted respectively to act as guides for the upper or straight portions of the links.

4. A bread slicing machine comprising a base, a housing united thereto, a shaft mounted in the base, a rocker-plate united to the shaft extending transversely across the base and having staggered slots formed in its front and rear edges, pivot-bars secured in the front and rear edges of the rocker passing through the slots adapted to engage and drive links, a plurality of links severally having their lower ends pivoted upon the pivot-bars and extending upwardly therefrom, a plurality of spaced cutting blades arranged in two alternating series and having their lower ends pivotally united to the upper ends of the links severally, the upper portions of said links being straight and arranged in line with the blades, a corresponding plurality of coiled tension springs having their upper ends adjustably united to the housing at the top thereof and their lower ends pivotally united to the upper ends of the cutting blades, means for reciprocating the rocker-plate and guide rolls extending transversely of the machine at the front and rear of the links and adapted respectively to act as guides for the upper or straight portions of the links of the two series.

5. A bread slicing machine comprising a base adapted to seat upon a counter or table, a housing united thereto inclining forwardly, a shaft mounted in the base, a rocker-plate united to the shaft extending transversely across the base and having staggered slots formed in its front and rear edges adapted to receive links, two alternating series of links severally having their lower ends pivotally secured in the slots and extending upwardly therefrom, a plurality of spaced cutting blades in series corresponding to the links having one end pivotally united to the upper ends of the links severally, the upper portions of said links being straight and arranged in line with the blades and their several lower portions being curved to the front or rear to enter the front and rear slots in the rocker-plate, resilient means united to the housing at or near the top thereof and their lower ends pivotally united to the upper ends of the cutting blades and exerting tension upwardly thereon, and means for reciprocating the rocker-plate.

6. A bread slicing machine comprising a base, a housing united thereto inclining forwardly, a shaft mounted in the base, a rocker-plate united to the shaft extending transversely across the base and having staggered slots formed in its front and rear edges adapted to receive links, two alternating series of links severally having their lower ends pivotally secured in the slots and extending upwardly therefrom, a plurality of spaced cutting blades in series corresponding to the links having one end pivotally united to the upper ends of the links severally, the upper portions of said links being straight and arranged in line with the blades and their several lower portions being curved to the front or rear to enter the front and rear slots in the rocker-plate, resilient means united to the housing at or near the top thereof and their lower ends pivotally united to the upper ends of the cutting blades and exerting tension upwardly thereon, and means for reciprocating the rocker-plate.

7. A bread slicing machine comprising a base, a housing united thereto inclining forwardly, a shaft mounted in the base, a rocker-plate united to the shaft extending transversely across the base and having staggered slots formed in its front and rear edges adapted to receive links, two alternating series of links severally having their lower ends pivotally secured in the slots and extending upwardly therefrom, a plurality of spaced cutting blades in series corresponding to the links having one end pivotally united to the upper ends of the links severally, the upper portions of said links being straight and arranged in line with the blades and their several lower portions being curved to the front or rear to enter the front and rear slots in the rocker-plate, resilient means united to the housing at or near the top thereof and their lower ends pivotally united to the upper ends of the cutting blades and exerting tension upwardly thereon, a steeply inclined bread chute united to the base sloping downwardly toward the blades at approximately a right angle to the plane of movement of the blades and having slots through which the blades may travel, and means for reciprocating the rocker-plate.

8. A bread slicing machine comprising a base adapted to seat upon a counter or table, a housing united thereto inclining forwardly, a shaft mounted in the base, a rocker-plate united to the shaft extending transversely across the base and having staggered slots formed in its front and rear edges adapted to receive links, two alternating series of links severally having their lower ends pivotally secured in the slots and extending upwardly therefrom, a plurality of spaced cutting blades in series corresponding to the links having one end pivotally united to the upper ends of the links severally, the upper portions of said links being straight and arranged in line with the blades and their several lower portions being curved to the front or rear to enter the front and rear slots in the rocker-plate, resilient means united to the housing at or near the top thereof and their lower ends pivotally united to the upper ends of the cutting blades and exerting tension upwardly thereon, a steeply inclined bread chute united to the base sloping downwardly toward the blades at approximately a right angle to the plane of movement of the blades and having slots through which the blades may travel, and means for reciprocating the rocker-plate.

9. A bread slicing machine comprising a base adapted to seat upon a counter or table, a housing united thereto inclining forwardly, a shaft mounted in the base, a rocker-plate united to the shaft extending transversely across the base and having means formed in its front and rear edges adapted to receive links, two alternating series of links severally having their lower ends pivotally secured in said means and extending upwardly therefrom, a plurality of spaced cutting blades in series corresponding to the links having one end pivotally united to the upper ends of the links severally, the upper portions of said links being straight and arranged in line with the blades and their several lower portions being curved to the front or rear to enter the front and rear slots in the rocker-plate, resilient means united to the housing at or near the top thereof and their lower ends pivotally united to the upper ends of the cutting blades and exerting tension upwardly thereon, and means for reciprocating the rocker-plate.

10. A bread slicing machine comprising a base, a housing united thereto inclining forwardly, a shaft mounted in the base, a rocker-plate united to the shaft extending transversely across the base and having means formed in its front and rear edges adapted to receive links, two alternating series of links severally having their lower ends pivotally secured in said means and extending upwardly therefrom, a plurality of spaced cutting blades in series corresponding to the links having one end pivotally united to the upper ends of the links severally, the upper portions of said links being straight and arranged in line with the blades and their several lower portions being curved to the front or rear to enter the front and rear slots in the rocker-plate, resilient means united to the housing at or near the top thereof and their lower ends pivotally united to the upper ends of the cutting blades and exerting tension upwardly thereon, and means for reciprocating the rocker-plate.

HARRY J. CRINER.